(12) United States Patent
Cai et al.

(10) Patent No.: US 11,472,087 B2
(45) Date of Patent: Oct. 18, 2022

(54) COMPOSITE RADIUS FILLER MANUFACTURING METHODS AND RELATED SYSTEMS

(71) Applicant: The Boeing Company, Chicago, IL (US)

(72) Inventors: Fei Cai, Mukilteo, WA (US); Weidong Song, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 368 days.

(21) Appl. No.: 16/364,167

(22) Filed: Mar. 25, 2019

(65) Prior Publication Data
US 2020/0307059 A1    Oct. 1, 2020

(51) Int. Cl.
  *B29C 48/155*  (2019.01)
  *B29C 48/35*   (2019.01)
  *B29C 48/92*   (2019.01)

(52) U.S. Cl.
  CPC ............ *B29C 48/155* (2019.02); *B29C 48/35* (2019.02); *B29C 48/92* (2019.02); *B29C 2948/92114* (2019.02); *B29C 2948/92514* (2019.02); *B29C 2948/92609* (2019.02); *B29C 2948/92876* (2019.02)

(58) Field of Classification Search
  None
  See application file for complete search history.

(56) References Cited

U.S. PATENT DOCUMENTS

| | | | | |
|---|---|---|---|---|
| 5,395,563 | A * | 3/1995 | Goto ..................... | B60J 10/22 156/244.18 |
| 2003/0140671 | A1 * | 7/2003 | Lande .................... | B05D 1/265 72/46 |
| 2012/0130684 | A1 * | 5/2012 | Feng ..................... | B29C 48/07 703/1 |
| 2014/0264991 | A1 * | 9/2014 | Hwang ................... | B29C 48/92 264/40.5 |
| 2017/0197350 | A1 | 7/2017 | Song | |
| 2019/0030819 | A1 | 1/2019 | Mantell et al. | |

OTHER PUBLICATIONS

Extended European Search Report prepared by the European Patent Office in application No. EP 20 15 6163.6 dated Jul. 6, 2020.

* cited by examiner

*Primary Examiner* — Jacob T Minskey
*Assistant Examiner* — Adrien J Bernard
(74) *Attorney, Agent, or Firm* — McDonnell Boehnen Hulbert & Berghoff LLP

(57) ABSTRACT

The present disclosure relates to systems and methods relating to the application of composite radius filler materials. An example material feed system includes a material container configured to contain a composite material and a material feed actuator. The material feed system also includes a nozzle coupled to the material container and a workpiece sensor configured to provide information about a workpiece. The material feed system also includes a controller. The controller is configured to receive, from the workpiece sensor, workpiece information. The workpiece information is indicative of at least one surface of the workpiece. The controller is also configured to, based on the workpiece information, cause the material feed actuator to apply a force to the composite material contained in the material container so as to extrude at least a portion of the composite material out of the nozzle and onto a surface of the workpiece.

20 Claims, 6 Drawing Sheets

COMPOSITE RADIUS FILLER MANUFACTURING METHODS AND RELATED SYSTEMS

FIELD

The present disclosure relates to systems and methods for applying composite radius filler materials. The radius filler, or "noodle," may be utilized to fill an interface between plies in laminate joints.

BACKGROUND

Composite spar, rib, or stringer members can be formed by coupling two composite structures. The composite structures could be formed from carbon fiber prepreg material and could take the form of channels shaped like the letter "C", "V", or "U". The plies of such channels are bent at a predetermined radius to form such shapes and do not have abrupt angles. Such channels could be coupled in a back-to-back arrangement to form a stringer member. In such arrangements, the stringer member could resemble a cavity, a dimple, or a rounded v-shaped groove where the rounded channels are joined.

A radius filler material can be added to the cavity region so as to strengthen the stringer member. Radius filler added to the cavity region can reduce distortions that the stringer member may experience under loading conditions. However, conventional radius filler application techniques are slow and inefficient.

SUMMARY

In an aspect, a system is described. The system includes a material feed system. The material feed system includes a material container configured to contain a composite material, a material feed actuator, and a nozzle coupled to the material container. The system also includes a workpiece sensor configured to provide information about a workpiece. Additionally, the system includes a controller configured to receive, from the workpiece sensor, workpiece information. The workpiece information is indicative of at least one surface of the workpiece. The controller is also configured to, based on the workpiece information, cause the material feed actuator to apply a force to the composite material contained in the material container so as to extrude at least a portion of the composite material out of the nozzle and onto a surface of the workpiece.

In another aspect, a method is described. The method includes receiving, from a workpiece sensor, workpiece information about at least one surface of a workpiece. The method also includes, based on the workpiece information, causing a material feed actuator of a material feed system to apply a force to a composite material contained in a material container so as to extrude at least a portion of the composite material out of a nozzle coupled to the material container and onto a surface of the workpiece.

Other aspects, examples, and implementations will become apparent to those of ordinary skill in the art by reading the following detailed description with reference, where appropriate, to the accompanying drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

DETAILED DESCRIPTION

I. Overview

Figure 1:
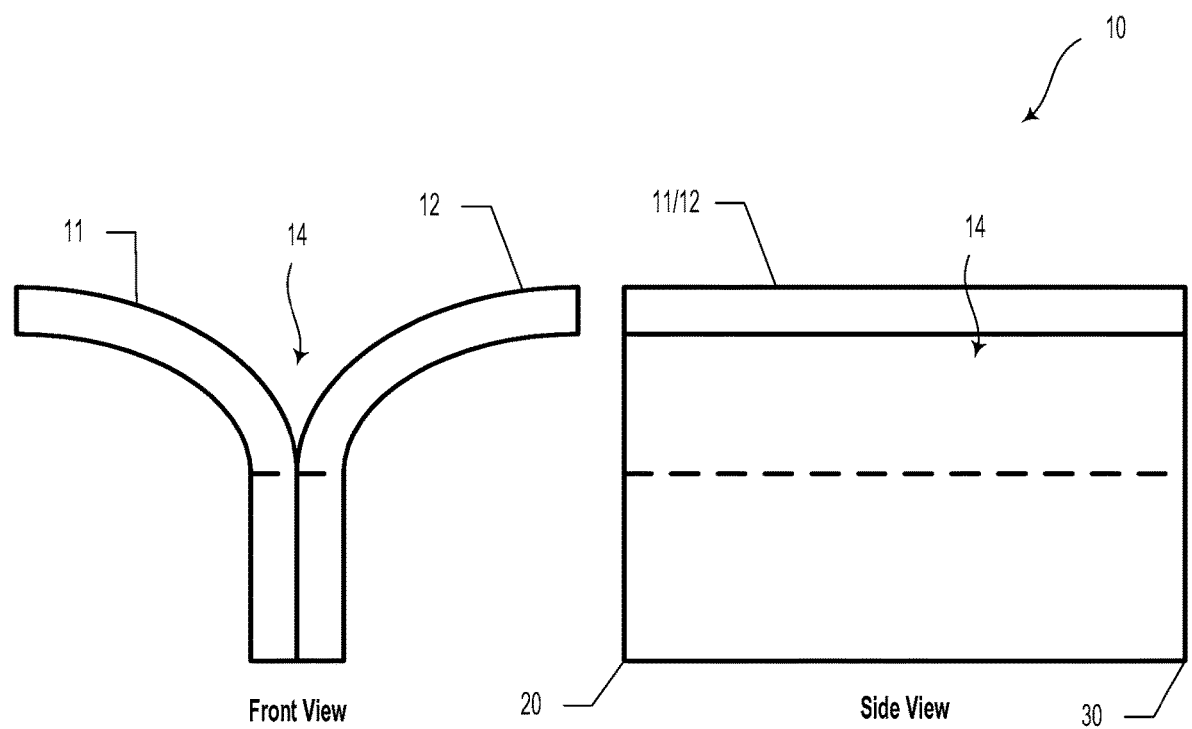
FIG. 1 illustrates a workpiece, according to an example implementation.
Figure 1:
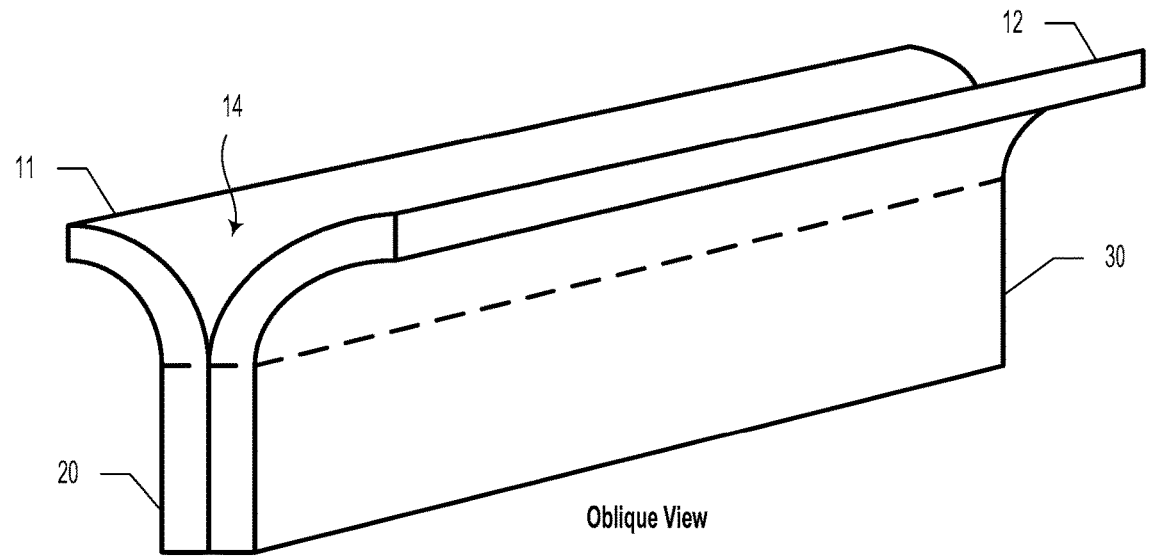

Example methods, devices, and systems are described herein. It should be understood that the words "example" and "exemplary" are used herein to mean "serving as an example, instance, or illustration." Any example or feature described herein as being an "example" or "exemplary" is not necessarily to be construed as preferred or advantageous over other examples or features. Other examples can be utilized, and other changes can be made, without departing from the scope of the subject matter presented herein.

Thus, the examples described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall examples, with the understanding that not all illustrated features are necessary for each example.

The present disclosure describes several steps that can beneficially improve the manufacturing of radius filler materials, and which, when taken together, can improve reliability and performance the composite part, as well as decrease its manufacturing cost.

In an example embodiment, a method could include utilizing a laser scanner to obtain a profile of the cavity region to be filled by the radius filler material. For instance, information indicative of at least one surface of the cavity region could be obtained by the laser scanner. The information could include a plurality of laser depth measurements. Namely, the depth of the cavity region could be scanned in a direction perpendicular to the length of the stringer member. The depth of the cavity region could be defined by the distance between a top and bottom of the cavity region. At least four consecutive depth measurements (or line scans) may be used to obtain an average of the gate height (e.g., using a moving average method). The depth measurements could be used to determine an average cross-sectional area of the cavity region. Based on the average cross-sectional area of the cavity region, various process variables (e.g., gate height, extrusion speed, etc.) could be determined from a lookup table. In such scenarios, based on the cross-section area of the cavity region, an extrusion system could be controlled to most-efficiently fill the cavity region with the radius filler material.

Additionally or alternatively, in some embodiments, a Fast Fourier Transform could be used to reduce or deemphasize the high-frequency fluctuations in the depth measurement and/or cross-sectional area data. For example, depth information obtained by a laser profilometer could be analyzed by way of one or more mathematical algorithms and/or transforms. In some embodiments, the depth information could be processed by passing it through a Fast Fourier Transform (FFT), which could provide a spatial frequency representation of the depth information. In some embodiments, the spatial frequency representation could be adjusted so as to provide low-pass filtering. The spatial frequency representation could be inverted with an inverse Fourier Transform (IFT) so as to reconstruct low-pass-filtered depth information. In such a fashion, the cross-sectional area data, as a function of distance along the stringer member, could be smoothed and/or averaged.

In addition to precisely monitoring the depth and/or cross-sectional area of the cavity region as a function of the distance along the stringer member, various operating parameters of the extruding system can be monitored and controlled in real time. For example, the extruding system could include a roller encoder device. At least one roller of the roller encoder device could make direct contact with the radius filler "noodle" to monitor extrusion speed. Additionally or alternatively, non-contact methods, such as a laser doppler system could also be used to monitor the real time extrusion speed of the noodle.

In some embodiments, the extruding system could include a side-view scanner to monitor the real time slope (e.g., shape) of the extruded noodle between a nozzle opening of the extrusion system and a compaction roller. In such scenarios, the extrusion speed and/or a speed of a robot controlling extrusion along the stringer member could be adjusted so as to maintain a predefined shape or range of shapes of the noodle. As an example, noodle bends with a radius of curvature less than a predefined threshold could indicate that the noodle is being compressed (robot speed is too slow), while bends with a radius of curvature greater than a predefined threshold could indicate that the noodle is being stretched (e.g., robot speed is too fast).

In other embodiments, a vision system (e.g., camera and/or laser imaging system) could be utilized to closely monitor and maintain a relative position between a nozzle of the robot and the stringer member. For example, the vision system could scan and determine the center of the stringer member in the X and Z direction, based on determining an intersection of two tangent lines. By determining the center of the stringer member, the systems and methods herein could guide the robot to maintain a desired target distance and/or target orientation between the nozzle and the stringer member.

The extrusion of the radius filler material could be controlled by monitoring and adjusting the torque applied to one or more ram servos that provide the extrusion force. In some embodiments, the system could be configured to extrude approximately 6 inches of material to establish torque feedback and/or for calibration purposes. Thereafter, a lead-in portion of the noodle may be clamped so as to avoid slippage. Once the lead-in portion is clamped and properly fed, the programmable logic controller may take control of the real-time extrusion process.

In some embodiments, the system could be configured to detect an end of the stringer member. In such a scenario, the system may adjust a position or torque of the ram servo and/or the piston based on a percentage of piston torque necessary to relieve the material pressure at the nozzle opening. A variable gate may completely close to cut the noodle from the rest of the radius filler material. The robot arm could then be positioned so as to ensure a clean cut of the noodle prior to resetting for the next stringer member.

The systems and methods described herein could provide a radius-filler manufacturing and deposition technique, which may reduce manufacturing lead time and cost, as compared to conventional radius-filler installations. The disclosed systems and methods could be utilized to produce a radius filler having the desired length and a cross-sectional shape, which is dynamically adjusted to correspond to the cross-sectional shape of the groove, into which the radius filler is deposited.

II. Example Systems

FIG. 1 illustrates a workpiece 10, according to an example implementation. The workpiece 10 could include composite spar, stringer, or rib members formed by coupling two or more composite structures. For example, workpiece 10 could include a first composite member 11 and a second composite member 12. In some embodiments, the first composite member 11 and the second composite member 12 could be formed from multi-ply carbon fiber prepreg material. The workpiece 10 could have a first end 20 and a second end 30.

As illustrated in FIG. 1, the first composite member 11 and the second composite member 12 could be coupled so as to form one or more rounded channels shaped like the letters "C", "V", or "U". Additionally or alternatively, the first composite member 11 and the second composite member 12 could form a shape similar to pages of an open book near its spine. In some example embodiments, the plies of the first composite member 11 and the second composite member 12 could be bent at a respective, predetermined radii to form such shapes. It will be understood that other shapes are possible and contemplated within the scope of the present disclosure.

In example embodiments, the first composite member 11 and the second composite member 12 could be coupled in a back-to-back arrangement to form a stringer member. In such arrangements, the stringer member could include a cavity region 14 or rounded v-shaped groove where the rounded channels are joined. As described herein, a radius filler material can be added to the cavity region 14 so as to strengthen the stringer member. Radius filler added to the cavity region 14 can improve stringer member strength and/or rigidity. It will be understood that other structural improvements could be possible by adding the radius filler to the cavity region 14.

Figure 2:
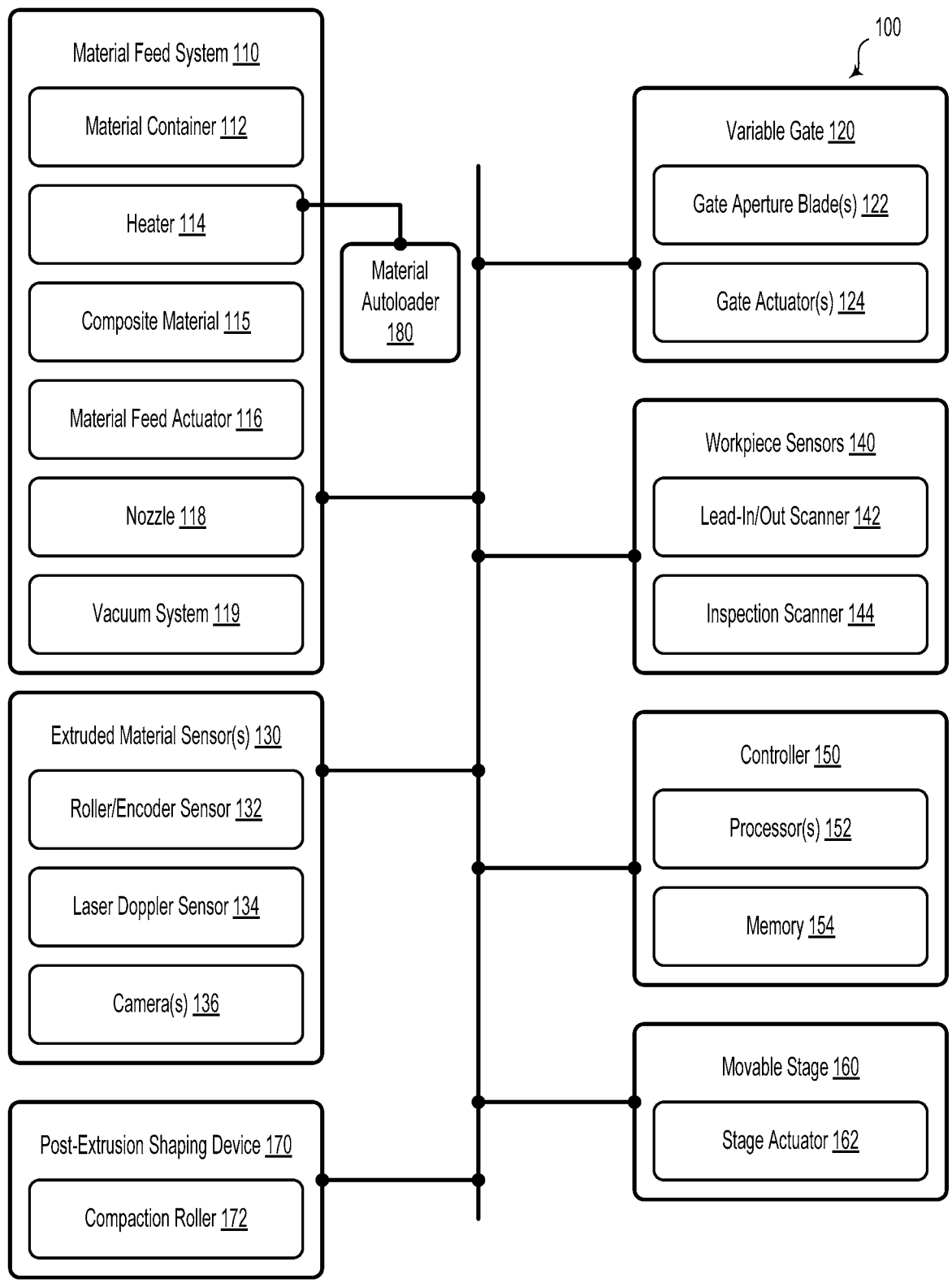
FIG. 2 illustrates a system, according to an example implementation.

FIG. 2 illustrates a system 100, according to an example implementation. The system 100 includes a material feed system 110. The material feed system 110 could be a hydraulic or mechanical screw auger extruder or a ram cylinder. The material feed system 110 includes a material container 112 configured to contain a composite material 115. In some embodiments, the composite material 115 could be made of a thermoset resin that is reinforced with chopped fibers. However other materials are possible and contemplated for the composite material 115.

In some embodiments, the material container 112 could include a hollow cylinder shape. However, other shapes are possible and contemplated. The material feed system 110 also includes a material feed actuator 116 configured to provide a controllable force on the composite material 115 so as to extrude it out of the material container 112. In some embodiments, the material feed actuator 116 could include a servo-driven actuator. However, other types of actuators are possible and contemplated. The material feed system 110 also includes a nozzle 118 coupled to the material container 112.

The material feed system 110 could include a vacuum system 119. The vacuum system 119 could be configured to maintain a desired vacuum level within the material container 112. In some embodiments, the vacuum system 119 could include a vacuum port that could be configured to as an opening through which excess gas could be removed from the material container 112 prior to material extrusion. The vacuum system 119 may also include a vacuum pump and vacuum gauge coupled to the material container 112. For example, prior to extruding extruded composite material 117, the vacuum pump may remove gas from the material container 112. In some embodiments, the pressure (e.g., vacuum level) could be monitored by way of the vacuum gauge. In various examples, the vacuum pump may be operated based on information received from the vacuum gauge. For example, the controller 150 could operate the vacuum pump to pump gases out of the material container 112 until the material container 112 reaches a predetermined threshold vacuum level or pressure. Removing excess gas from the material container 112 could reduce or eliminate trapped air or other trapped gases, which may form bubbles, voids, or other non-uniformities in the composite material 115 and/or extruded composite material 117.

In some embodiments, the controller 150 could monitor the vacuum level of the material container 112 in relation to performing various operations described herein. For example, the controller 150 could provide a vacuum level interlock feature. The vacuum level interlock feature could, for example, prevent operation of the heater 114, material feed actuator 116, and/or other elements of system 100 if the present vacuum level of the material container 112 is not within a predetermined range or ranges.

In various embodiments, the vacuum level interlock feature could be triggered or otherwise engaged based on predetermined time periods. For example, if after initiating a pump out of the material container 112 with the vacuum system 119, the vacuum level of the material container 112 does not reach a predetermined vacuum range within a predetermined period of time, the controller 150 will prevent the operation of the heater 114, material feed actuator 116, and/or other elements of system 100. In such a scenario, the vacuum level interlock feature could help prevent damage to the system 100 or extrusion of improperly prepared material. Additionally, the vacuum level interlock feature could improve overall quality, consistency, and/or repeatability of the extruded material by ensuring a consistent vacuum level prior to material extrusion.

In some embodiments, system 100 may include a material autoloader 180. The material autoloader 180 may provide the functionality to fill and/or replace the composite material 115 within the material feed system 110 in an automated, repeatable, and/or rapid fashion. For example, in some embodiments, the material autoloader 180 could be configured to replace an empty material container with a full material container in an automated or semi-automated (e.g., when initiated by a user command) manner.

In some embodiments, the material feed actuator 116 could be actuated so as to expel or eject extruded composite material 117 out of the material container 112, similar to a plunger of a syringe. The material feed actuator 116 could include ram servo or another type of piston. In other words, the material feed system 110, material container 112, and material feed actuator 116 could provide a reciprocating pump for extruding the composite material 115. Namely, the material feed actuator could be configured to move linearly into and out of the material container 112 along a cylindrical axis of the material container 112.

The system 100 also includes a workpiece sensor 140 configured to provide information about a workpiece (e.g., workpiece 10 as illustrated and described in relation to FIG. 1). The workpiece sensor 140 could include, in various embodiments, a lead-in/out scanner 142 and/or an inspection scanner 144.

The system 100 additionally includes a controller 150. In some embodiments, the controller 150 could include at least one processor 152 and a memory 154. The at least one processor 152 may include, for instance, a microprocessor, an application-specific integrated circuit (ASIC), or a field-programmable gate array (FPGA). Other types of processors, circuits, computers, or electronic devices configured to carry out software instructions are contemplated herein. In some embodiments, the controller 150 could be configured to communicatively interact with a graphical user interface (GUI), a Human Machine Interface (HMI), and/or a Man Machine Interface (MMI). For example, the GUI, HMI, and/or MMI could provide a way for a user to input user-defined parameters (e.g., stringer length, desired extruded composite material shape, etc.). Any or all of the operations of the controller 150 described herein could be based, at least in part, on the interactions with the GUI, HMI, and/or MMI. The controller 150 could also include one or more hardware data interfaces, which may provide a communicative link between the controller 150 and other elements of system 100. In some embodiments, the GUI, HMI, and/or MMI could also display notifications or other types of information to the user. For example, a display of the GUI, HMI, and/or MMI could display fault information, which may require user intervention or interaction.

The memory 154 may include a non-transitory computer-readable medium, such as, but not limited to, read-only memory (ROM), programmable read-only memory (PROM), erasable programmable read-only memory (EPROM), electrically erasable programmable read-only memory (EEPROM), non-volatile random-access memory (e.g., flash memory), a solid state drive (SSD), a hard disk drive (HDD), a Compact Disc (CD), a Digital Video Disk (DVD), a digital tape, read/write (R/W) CDs, R/W DVDs, etc.

The at least one processor 152 of controller 150 may be configured to execute instructions stored in the memory so as to carry out various operations and method steps/blocks described herein. The instructions may be stored in a permanent or transitory manner in the memory.

Figure 6:
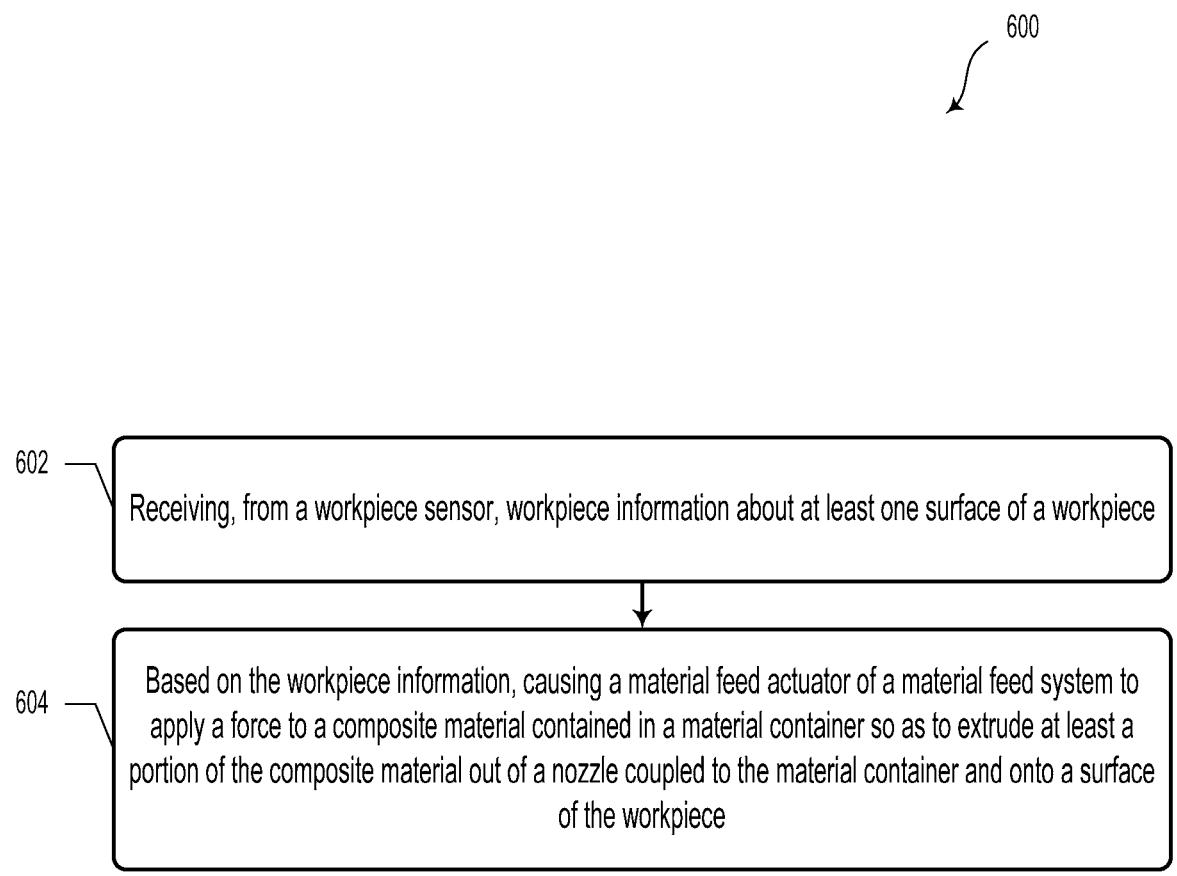
FIG. 6 illustrates a method, according to an example implementation.

As an example, the controller 150 could be configured to carry out operations such as those of method 600 as illustrated and described in relation to FIG. 6.

The controller 150 could be configured to receive, from the workpiece sensor 140, workpiece information. The workpiece information could be indicative of at least one surface of the workpiece 10. For example, the workpiece information could include information about one or more contours of the workpiece 10 and/or topographical information about the cavity region 14. In other words, the workpiece information could include information about a depth, a width, and/or a cross-sectional area of the cavity region. The controller 150 could additionally be configured to, based on the workpiece information, cause the material feed actuator 116 to apply a force to the composite material 115 contained in the material container 112 so as to extrude extruded composite material 117 out of the nozzle 118 and onto a surface of the workpiece 10.

In some embodiments, the system 100 could include a variable gate 120. The variable gate 120 could include one or more gate aperture blades 122, which could be positionally adjusted by way of one or more gate actuators 124. In such scenarios, the controller 150 could be further configured to, based on the workpiece information, adjust at least one of the gate aperture blades 122 of the variable gate 120 so as to control a dimension of the extruded composite material 117 extruded out of the nozzle 118. For example, the gate aperture blades 122 could be controllably adjusted so as to form a rectangular aperture or opening having an opening area of between 0.0 (e.g., completely closed) to 0.5 in$^2$. The aperture shape could be based on the number of gate aperture blades 122, the respective position of the gate aperture blades 122, and respective shape of each gate aperture blade 122. In some embodiments, the aperture shape could be circular or semi-circular. In other embodiments, the aperture shape could be square. Other aperture shapes are possible and contemplated.

In some embodiments, the system 100 could additionally include an extruded material sensor 130 configured to provide extrusion information. In such scenarios, the extrusion information could be indicative of a linear extrusion speed of the extruded composite material 117 that is expelled out of the nozzle 118. As an example, the linear extrusion speed could be measured within a range of 1 mm/s to 1 m/s. However, the measurement of higher or lower linear extrusion speeds is possible and contemplated. In some examples, the linear extrusion speed could be the speed at which extruded composite material 117 is produced perpendicular to the nozzle. However, in alternative embodiments, linear extrusion speed could be measured along another axis, such as along the surface of the workpiece 10 and/or cavity region 14.

In some embodiments, the system 100 could include a movable stage 160, which may be coupled to the workpiece 10. For example, the workpiece 10 could rest on, or be fixedly coupled to, the movable stage 160. Additionally or alternatively, the movable stage 160 could be coupled to other elements of the system 100 so as to controllably adjust a relative position between the material feed system 110 and the workpiece 10.

Figure 3:
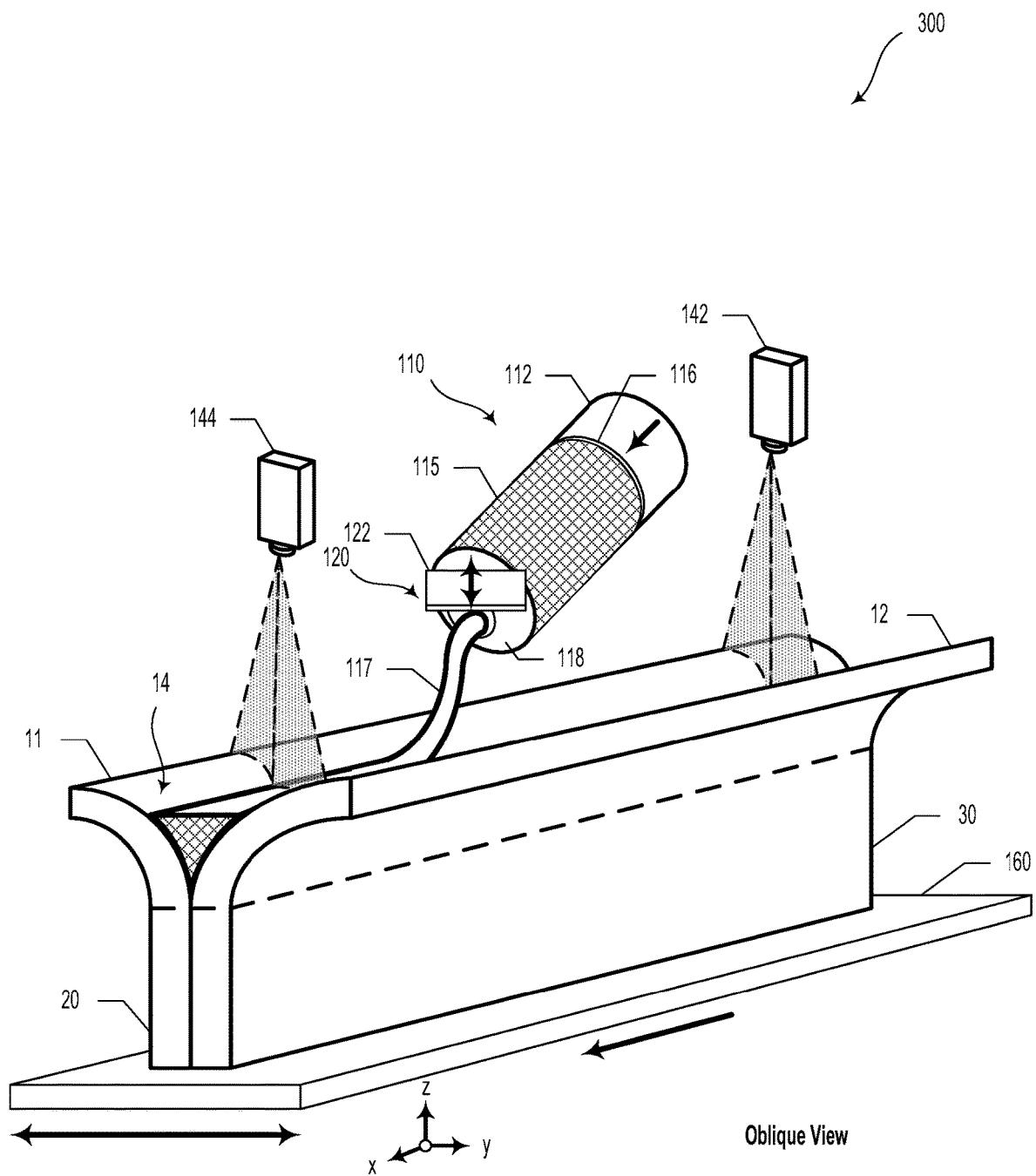
FIG. 3 illustrates an operating scenario involving the system of FIG. 2, according to an example implementation.

In such scenarios, the controller 150 could be further configured to move the movable stage 160 such that a relative speed of the workpiece 10 with respect to the material feed system 110 is substantially the same (e.g., within 10%, within 1%, or within 0.1%) as the linear extrusion speed of the extruded composite material 117 extruded out of the nozzle 118. For example, as illustrated in FIG. 3, the controller 150 could adjust a position of the movable stage 160 along the x axis at a speed so as to substantially match the linear extrusion speed of the extruded composite material 117.

Additionally or alternatively, the controller 150 could be configured to move the movable stage 160, based on the workpiece information or the extrusion information, such that the extruded composite material 117 extruded out of the nozzle 118 is aligned with a cavity along a surface of the workpiece 10. For example, as illustrated in FIG. 3, the controller 150 could adjust a position of the movable stage 160 along the y axis so as to align the extruded composite material 117 with the cavity region 14.

In some embodiments, the extruded material sensor 130 could include at least one of: a roller sensor, an encoder wheel sensor (e.g., roller/encoder sensor 132), a laser doppler sensor 134, or a camera 136. For example, a wheel or roller of the roller/encoder sensor 132 could be configured to be in physical contact with the extruded composite material 117. In such scenarios, as the extruded composite material 117 is expelled from the nozzle 118, the wheel or roller could be configured to rotate. By measuring the speed and/or amount of angular rotation of the wheel or roller, the roller/encoder sensor 132 could be configured to provide information about an extrusion speed and/or extrusion length of the extruded composite material 117.

Additionally or alternatively, the laser doppler sensor 134 could be configured to provide non-contact laser doppler velocimetry measurements of the extruded composite material 117 as it is expelled from the nozzle 118. For example, the laser doppler sensor 134 could include a laser light source and one or more photodetectors. The laser light source could emit laser light that could interact with the extruded composite material 117. The one or more photodetectors could be configured to detect the light reflected from the extruded composite material 117. In various embodiments, the velocity of the extruded composite material 117 could be obtained by measuring the change in wavelength of the reflected laser light, which can be observed by forming an interference fringe pattern. In some embodiments, the interference fringe pattern could be formed by superimposing the original and reflected light signals.

In some embodiments, the camera 136 could be configured to image the extruded composite material 117. In such scenarios, the captured images of the extruded composite material 117 could be analyzed to determine a velocity of the extruded composite material 117 as it is expelled from the nozzle 118. For example, the camera 136 may capture a plurality of images in a periodic fashion. By observing a position of the extruded composite material 117 as it changes over the plurality of images, a velocity of the extruded composite material 117 can be determined.

In various embodiments, the material container 112 could additionally include a heater 114 configured to heat the composite material 115. In such scenarios, the controller 150 could be configured to adjust an operation of the heater 114 based on the linear extrusion speed of the extruded composite material 117 extruded out of the nozzle 118.

In some embodiments, the workpiece sensor 140 could include a laser profilometer. In such scenarios, the workpiece information could be indicative of a depth of a cavity (e.g., cavity region 14) or other topographic features along a surface of the workpiece 10.

In example embodiments, the system 100 could include one or more of the lead-in/out scanner 142. In such scenarios, the workpiece information could be indicative of at least one of: a lead-in condition or a lead-out condition. Accordingly, the controller 150 could be further configured to adjust the force applied to the composite material 115 in the material container 112 in response to determining the lead-in condition or the lead-out condition.

In some embodiments, system 100 could also include a post-extrusion shaping device 170. For example, the system 100 could include a compaction roller 172 configured to shape the extruded composite material 117 extruded out of the nozzle 118 on the workpiece 10. In such scenarios, the controller 150 is further configured to adjust a pressure applied by the compaction roller 172 to the extruded composite material 117. In reference to FIG. 5A, the compaction roller 172 could impart a controllable force to the extruded composite material 117 along the −z direction. In some embodiments, the compaction roller 172 could modify a shape of the extruded composite material 117 within the cavity region 14 of the workpiece 10. For example, in various embodiments, a surface (e.g., compaction surface 506 as illustrated and described in relation to FIG. 5A) of the compaction roller 172 could include at least one of: a flat shape, a crown shape or a kinked shape. The shape of the surface of the compaction roller 172 could be imparted, at least in part, to the extruded composite material 117.

FIG. 3 illustrates an operating scenario 300 involving the system 100 of FIG. 2, according to an example implementation. For example, operating scenario 300 could include a material feed system 110 with a material container 112. A material feed actuator 116 could be configured to provide a force on composite material 115 within the material container 112 so as to extrude extruded composite material 117 out of a nozzle 118. In some embodiments, the extruded composite material 117 could be cut, shaped, or otherwise modified by variable gate 120. For example, the variable gate 120 could include the gate aperture blades 122 that are controllable, which could be adjusted by gate actuator 124 (not illustrated). In some embodiments, the gate aperture blade 122 could move along the z-axis so as to adjust a size/shape of an aperture formed by the variable gate 120. The size/shape of the aperture formed by the variable gate 120 could in turn determine the size and/or shape of the extruded composite material 117.

The operating scenario 300 includes a workpiece 10 and a movable stage 160. The workpiece 10 could include a first composite member 11 and a second composite member 12. The first composite member 11 and the second composite member 12 could be coupled so as to form a cavity region 14. The movable stage 160 could be moved so as to control the position of the extruded composite material 117 within the cavity region 14. For example, in some embodiments, a position of the movable stage 160 could be adjusted along the y axis so as to center the extruded composite material 117 along the cavity region 14. Additionally or alternatively, the position of the movable stage 160 could be adjusted along the x axis so as to controllably apply the extruded composite material 117 along the cavity region 14. For example, in some embodiments, the movable stage 160 could be moved along the +x direction so as to allow the extruded composite material 117 to be filled with the extruded composite material 117 from a first end 20 of the workpiece 10 toward a second end 30 of the workpiece 10.

Operating scenario 300 may include a lead-in/out scanner 142, which could be configured to provide workpiece information. The workpiece information could include height/depth information about a surface of the workpiece 10 (e.g., the cavity region 14). The workpiece information could also include information about a lead-in condition. The lead-in condition could include an indication that a leading edge (e.g., first end 20) of the workpiece 10 is passing the lead-in/out scanner 142.

The lead-in/out scanner 142 could additionally be configured to provide information about a lead-out condition. The lead-out condition could include an indication that a lagging edge (e.g., second end 30) is passing the lead-in/out scanner 142.

While the lead-in/out scanner 142 is illustrated as a line-scanning profilometer, it will be understood that the lead-in/out scanner 142 could include one or more other types of sensors. For example, a photodetector could be utilized to determine a leading/lagging edge position of the workpiece 10. Additionally or alternatively, other non-contact surface characterization methods are possible and contemplated so as to provide the workpiece information.

Operating scenario 300 may include an inspection scanner 144. The inspection scanner 144 could include a scanning profilometer, a camera, and/or another type of non-contact surface characterization device. The inspection scanner 144 could detect a finished (e.g., compacted) state of the extruded composite material 117 within the cavity region 14. In such scenarios, the inspection scanner 144 could provide information to the controller 150 that could be indicative of over- or under-filling of the cavity region 14 in comparison to a desired filling level or shape. In response to determining that the cavity region 14 has been over- or under-filled, the controller 150 could adjust one or more elements of the system 100 so as to provide the desired filling level or shape for further extruded composite material 117.

Figure 4A:
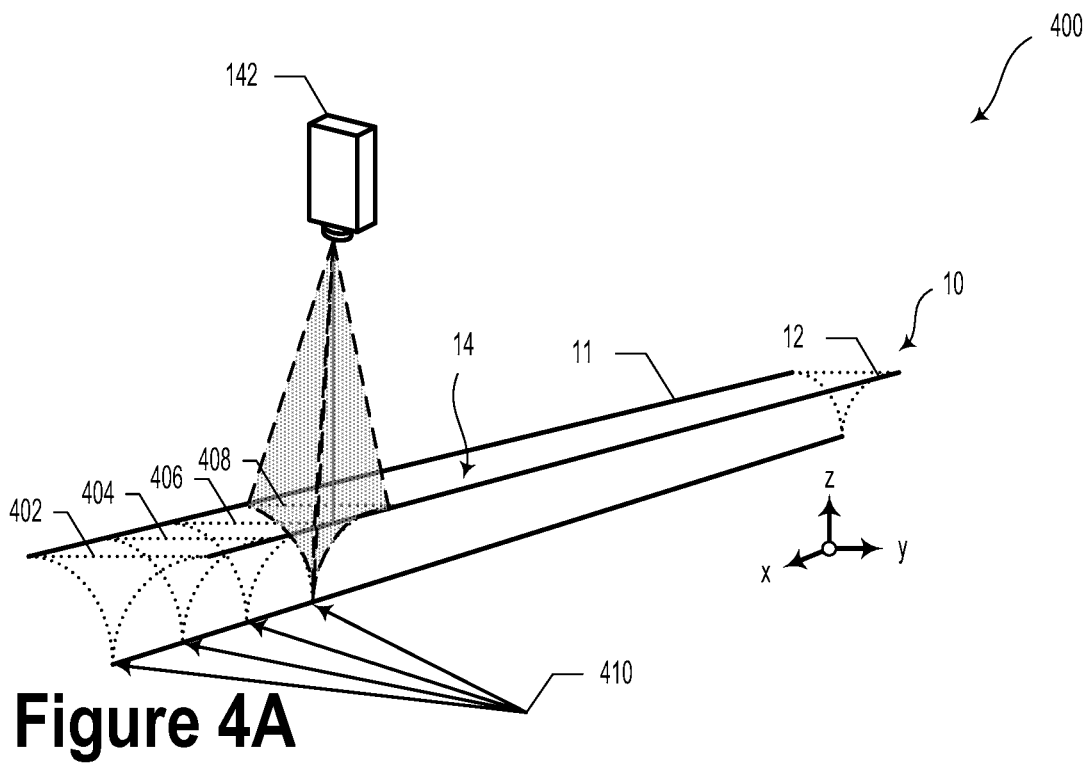
FIG. 4A illustrates an operating scenario involving the system of FIG. 2, according to an example implementation.

FIG. 4A illustrates an operating scenario 400 involving the system 100 of FIG. 2, according to an example implementation. The operating scenario 400 includes obtaining a plurality of profilometer scans 402, 404, 406, and 408, which together form four consecutive scans 410. Each of the profilometer scans 402, 404, 406, and 408 could provide workpiece information indicative of a cross-sectional area of the cavity region 14 along a contour line scanned across the cavity region 14. In some embodiments, the controller 150 could be configured to determine the cross-sectional area of the cavity region 14 based on the workpiece information.

In some embodiments, the lead-in/out scanner 142 could be configured to conduct a line scan at a desired time interval (e.g., 1 scan per second, 10 scans per second, 100 scans per second).

Figure 4B:
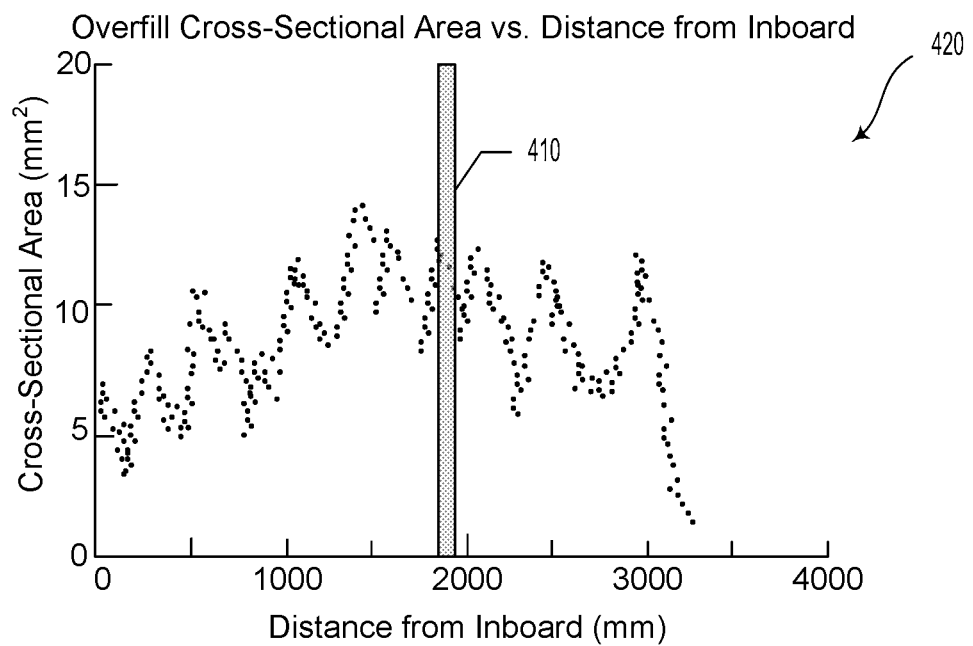
FIG. 4B illustrates data obtained by the system of FIG. 2, according to an example implementation.

FIG. 4B illustrates sample data 420 obtained by the system 100 of FIG. 2, according to an example implementation. The sample data 420 could include the workpiece information provided by the lead-in/out scanner 142. The sample data 420 could indicate the cross-sectional area of the cavity region 14 of a workpiece 10 versus the linear distance away from an inboard reference location (e.g., first end 20 of workpiece 10).

Various aspects of system 100 could be adjusted based on the sample data 420 (e.g., the workpiece information). For example, in response to determining that a linear profilometer scan of the cavity region 14 provides a relatively large cross-sectional area, the variable gate 120 could be controlled (e.g., by the controller 150) so as to enlarge an aperture (e.g., a rectangular opening) formed by the gate aperture blades 122. In such a scenario, the gate actuator(s) 124 could be extended or retracted so as to adjust the position of the gate aperture blades 122. Accordingly, the extruded composite material 117 could have a large cross-sectional area (e.g., 0.5 in$^2$) so as to fill the relatively larger cross-sectional area of the cavity region 14.

In contrast, if a linear profilometer scan of the cavity region 14 indicates a relatively small cross-sectional area, the variable gate 120 could, at least in part, close the gate aperture blade(s) 122 so as to reduce a size of the aperture they form. In such scenarios, the extruded composite material 117 could have a smaller cross-sectional area (e.g., 0.1 in$^2$) so as to fill the relatively smaller cross-sectional area of the cavity region 14.

Accordingly, the lead-in/out scanner 142 could provide workpiece information to the controller 150 in real-time. Furthermore, the controller 150 could responsively adjust the gate aperture blades 122 in real-time or near real-time so as to provide a uniform and efficient filling of the cavity region 14.

The sample data 420 could be averaged and/or processed so as to reduce or mitigate measurement errors or outlying data values. For example, a moving average of the four consecutive scans 410 (e.g., profilometer scans 402, 404, 406, and 408) could be used so as to reduce the influence of an anomalous measurement.

Figure 5A:
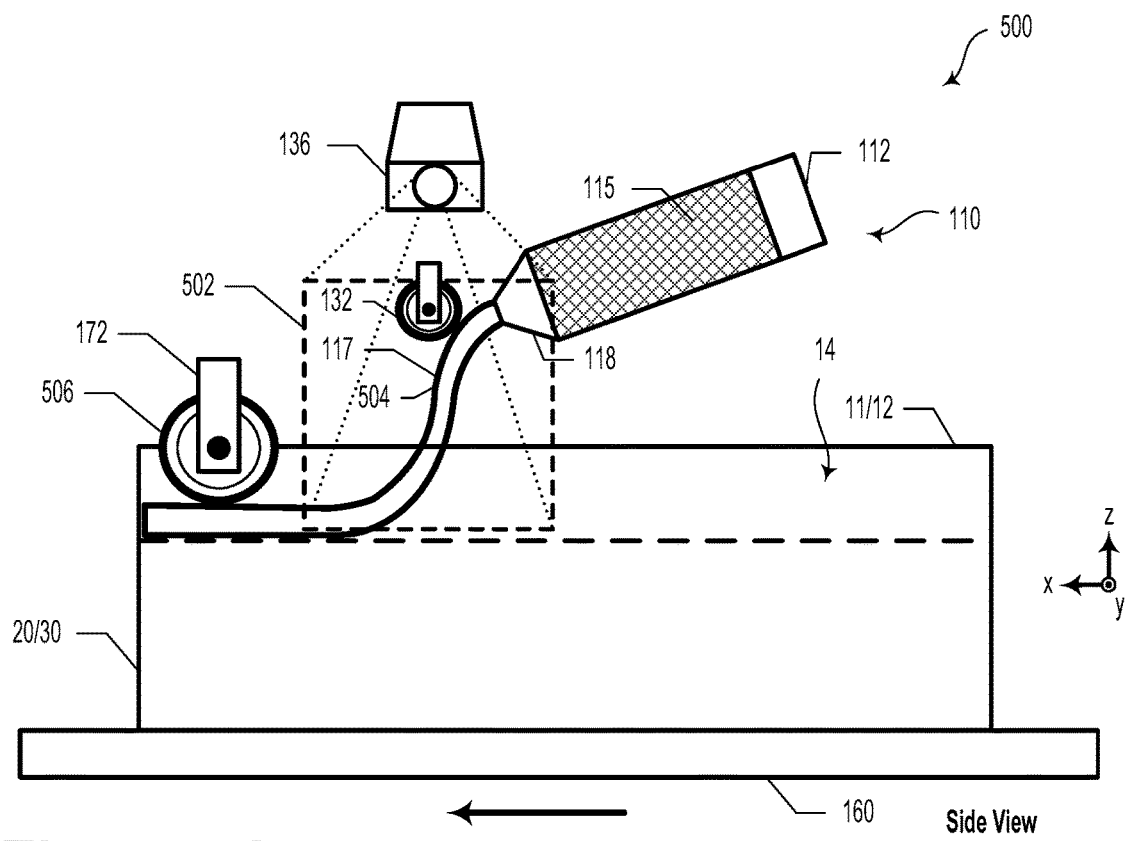
FIG. 5A illustrates an operating scenario involving the system of FIG. 2, according to an example implementation.

FIG. 5A illustrates an operating scenario 500 involving the system 100 of FIG. 2, according to an example implementation. The operating scenario 500 could include the material feed system 110, which could provide extruded composite material 117. In some embodiments, the extruded composite material 117 could be interrogated by way of one or more extruded material sensors 130. For example, as illustrated, the extruded composite material 117 could pass along a roller/encoder sensor 132. In such scenarios, the extruded composite material 117 may cause a rotating member of the roller/encoder sensor 132 to rotate. As the rotating member rotates, the roller/encoder sensor 132 could provide extrusion information about the extruded composite material 117. In an example embodiment, the extrusion information could be indicative of an extrusion speed of the extruded composite material 117.

Additionally or alternatively, the operating scenario 500 could include a post-extrusion shaping device 170. For example, as illustrated in FIG. 5A, a compaction roller 172 could provide a force so as to compact the extruded composite material 117 into the cavity region 14. In some embodiments, a surface of the compaction roller 172 could be shaped so as to produce a desired shape to at least one surface of the compacted extruded composite material 117.

Furthermore, in some embodiments, the operating scenario 500 could include a camera 136 configured to provide a side view 502 of the shape 504 of the extruded composite material 117. In some embodiments, the shape 504 of the extruded composite material 117 is based on a relative speed of the workpiece 10 and the material feed system 110 and the extrusion speed.

Figure 5B:
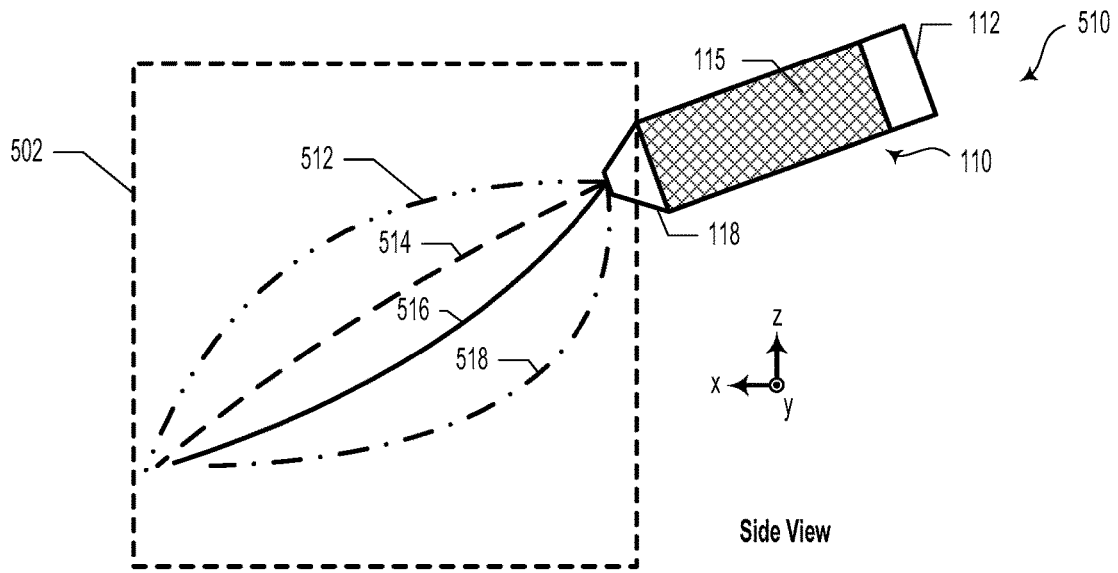
FIG. 5B illustrates various noodle shapes, according to example implementations.

FIG. 5B illustrates various noodle shapes 510, according to example implementations. The various noodle shapes 510 could be provided based on various combinations of a relative speed of the workpiece 10 and the extrusion speed of extruded composite material 117 from the material feed system 110. For example, noodle shapes 512 and 518 could result from the relative speed of the workpiece 10 being too slow compared to the extrusion speed. Noodle shapes 512 and 518 could indicate that the respective noodles are being undesirably compressed or kinked.

Noodle shape 514 could indicate that the relative speed of the workpiece 10 could be too fast in comparison to the extrusion speed. In such a scenario, noodle shape 514 could indicate that the noodle is being undesirably stretched.

Noodle shape 516 could indicate a desired balance between the relative speed of the workpiece 10 and the extrusion speed. In such scenarios, the noodle may have better structural and conformal properties because the noodle is not undesirably kinked, compressed, or stretched.

Accordingly, disclosed systems and methods could include adjusting a relative speed of the workpiece 10 and/or the extrusion speed so as to achieve a desired noodle shape (e.g., noodle shape 516) for the extruded composite material 117. It will be understood that the particular desirable noodle shapes may vary based on, for example, various composite material, viscosity, speed ranges, noodle diameter/shape, etc.

III. Example Methods

FIG. 6 illustrates a method 600, according to an example implementation. Method 600 may involve elements of system 100 as illustrated and described in reference to FIG. 2. Additionally or alternatively, some or all elements of method 600 may relate to operating scenarios 300, 400, and 500 as illustrated in FIGS. 3, 4A, and 5A. While FIG. 6 illustrates certain blocks or steps of method 600 as following a specific order, it will be understood that some blocks or steps of method 600 could be omitted and/or other blocks or steps could be included. Furthermore, the blocks or steps of method 600 could be carried out in a different order, in parallel (e.g., concurrently), and/or repeated. In some embodiments, at least some blocks of method 600 could be carried out, at least in part, by controller 150, as illustrated and described in reference to FIG. 2.

Block 602 includes receiving, from a workpiece sensor (e.g., workpiece sensor 140), workpiece information about at least one surface of a workpiece (e.g., workpiece 10). The workpiece information could include, for example, topographical information about a surface of the workpiece (e.g., a depth of the cavity region 14). Receiving the workpiece information could be provided by the controller 150 in a wired or wireless fashion.

Block 604 includes, based on the workpiece information, causing a material feed actuator (e.g., material feed actuator 116) of a material feed system (e.g., material feed system 110) to apply a force to a composite material contained in a material container so as to extrude at least a portion of the composite material out of a nozzle coupled to the material container and onto a surface of the workpiece.

In some embodiments, the workpiece sensor could include a laser profilometer or another type of topographic scanning device. In such scenarios, the workpiece information could be indicative of at least one of: a depth, a width, or a cross-sectional area of a cavity (e.g., cavity region 14) along a surface of the workpiece. In an example embodiment, the laser profilometer could include a LJ-V7000 Keyence Ultra-High Speed In-line Profilometer. However, other models and/or types of laser profilometers are possible and contemplated. In some embodiments, the laser profilometer could utilize a laser displacement sensor configured to measure surface topography with sub-micron precision over an area 500 mm×500 mm in size.

It will be understood that various analysis and/or processing of the workpiece information could be performed. As an example, in some embodiments, the method 600 could include filtering the workpiece information by way of at least one of a moving average or a Fast Fourier Transform. Other data smoothing and/or averaging techniques are contemplated and possible. In such a manner, the presence of spurious measurements (e.g., measurement noise) in the workpiece information may be reduced or mitigated.

In some embodiments, method 600 could also include, based on the workpiece information, adjusting at least one gate aperture blade (e.g., gate aperture blades 122) of a variable gate (e.g., variable gate 120) so as to control a dimension of the composite material (e.g., extruded composite material 117) extruded out of the nozzle (e.g., nozzle 118).

Additionally or alternatively, the method 600 could include receiving, from an extruded material sensor (e.g., extruded material sensor 130), extrusion information indicative of a linear extrusion speed of the composite material extruded out of the nozzle. In such scenarios, the method 600 may also include moving a movable stage (e.g., movable stage 160) coupled to the workpiece such that a relative speed of the workpiece with respect to the material feed system is substantially the same as the linear extrusion speed of the composite material extruded out of the nozzle.

In various embodiments, the method 600 may further include, based on the workpiece information or extrusion information indicative of a linear extrusion speed of the composite material out of the nozzle, moving a movable stage coupled to the workpiece such that the composite material extruded out of the nozzle is aligned with a cavity (e.g., cavity region 14) along a surface of the workpiece.

In some embodiments, the method 600 may additionally include receiving, from an extruded material sensor, extrusion information indicative of a linear extrusion speed of the composite material extruded out of the nozzle. In such scenarios, the method 600 may also include, based on the linear extrusion speed of the composite material extruded out of the nozzle, adjusting an operation of a heater (e.g., heater 114) coupled to the material container. As described elsewhere herein, the heater could be configured to heat the composite material so as to maintain or achieve a desired temperature (e.g., 120° F.+/−5° F. or between 120-150° F.) and/or a desired composite material viscosity.

In some embodiments, the method 600 could include receiving, from a vacuum gauge, vacuum information about a vacuum level of the material container. In such a scenario, causing the material feed actuator of the material feed system to apply a force to the composite material contained in a material container could be initiated and/or performed in response to the vacuum information being indicative of the vacuum level of the material container being below a desired vacuum level.

In example embodiments, the method 600 could include receiving, from the workpiece sensor, workpiece information that is indicative of at least one of a lead-in condition or a lead-out condition. In such scenarios, the method 600 also includes, in response to determining the lead-in condition or the lead-out condition, adjusting the force applied to the composite material in the material container. For example, in response to determining a lead-in condition, the controller 150 could cause the material feed actuator 116 to provide a force on the composite material 115 so as to extrude it out of the nozzle 118. Additionally or alternatively, in response to determining a lead-out condition, the controller 150 could cause the material feed actuator 116 to stop providing a force on the composite material 115 and/or cause the gate aperture blade(s) 122 to close so as to cut the extruded composite material 117 (e.g., cutting the noodle).

In some embodiments, method 600 includes applying, with a compaction roller (e.g., compaction roller 172), a force to the composite material extruded out of the nozzle so as to form a desired shape of the composite material extruded out of the nozzle on the surface of the workpiece.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A system comprising:
    a material feed system, comprising:
        a material container configured to contain a composite material;
        a material feed actuator; and
        a nozzle coupled to the material container;
    a workpiece sensor configured to provide information about a workpiece, wherein the workpiece sensor comprises a laser profilometer;
    an extruded material sensor configured to provide extrusion information, wherein the extrusion information is indicative of a linear extrusion speed of the composite material extruded out of the nozzle, wherein the extruded material sensor comprises a camera and at least one of: a roller sensor or a laser doppler sensor;
    a compaction roller configured to shape the composite material extruded out of the nozzle on the workpiece; and
    a side-view scanner configured to monitor a real time slope of the composite material between the compaction roller and the nozzle; and
    a controller configured to:
        receive, from the laser profilometer of the workpiece sensor, a profile of a cavity along a surface of the workpiece to be filled with the composite material, wherein the profile is indicative of at least a cross-sectional area of the cavity that varies along the surface of the workpiece;
        in response to receiving the profile and based on at least the cross-sectional area of the cavity indicated by the profile, cause the material feed actuator to apply a force to the composite material contained in the material container so as to extrude at least a portion of the composite material out of the nozzle and onto the surface of the workpiece, and dynamically adjust the linear extrusion speed to maintain a predefined shape of the composite material between the compaction roller and the nozzle.

2. The system of claim 1, further comprising a variable gate, wherein the controller is further configured to, based on the profile, adjust at least one gate aperture blade of the variable gate so as to control a dimension of the composite material extruded out of the nozzle.

3. The system of claim 1, further comprising a movable stage coupled to the workpiece, wherein the controller is further configured to:

move the movable stage such that a relative speed of the workpiece with respect to the material feed system is substantially the same as the linear extrusion speed of the composite material extruded out of the nozzle.

4. The system of claim 3, wherein the controller is further configured to:

move the movable stage, based on the profile or the extrusion information, such that the composite material extruded out of the nozzle is aligned with a cavity along a surface of the workpiece.

5. The system of claim 1, further comprising a vacuum system configured to maintain a desired vacuum level within the material container.

6. The system of claim 1, wherein the workpiece sensor is further configured to provide at least one of a lead-in condition or a lead-out condition to the controller, wherein the controller is further configured to adjust the force applied to the composite material in the material container in response to determining the lead-in condition or the lead-out condition.

7. The system of claim 1, wherein the controller is further configured to adjust a pressure applied by the compaction roller to the composite material extruded out of the nozzle.

8. The system of claim 1, wherein the compaction roller comprises at least one of: a flat shape, a crown shape or a kinked shape.

9. A method comprising:

receiving, from a laser profilometer of a workpiece sensor, a profile of a cavity along a surface of the workpiece to be filled with a composite material, wherein the profile is indicative of at least a cross-sectional area of the cavity that varies along the surface of the workpiece;

receiving, from an extruded material sensor, extrusion information indicative of a linear extrusion speed of the composite material extruded out of nozzle, wherein the extruded material sensor comprises a camera and at least one of a roller sensor or a laser doppler sensor;

in response to receiving the profile and based on at least the cross-sectional area of the cavity indicated by the profile, causing a material feed actuator of a material feed system to apply a force to a composite material contained in a material container so as to extrude at least a portion of the composite material out of a nozzle coupled to the material container and onto the surface of the workpiece;

shaping, with a compaction roller, the composite material extruded out of the nozzle on the workpiece;

monitoring, with a side-view scanner, a real time slope of the composite material between the compaction roller and the nozzle; and dynamically adjusting the linear extrusion speed to maintain a predefined shape of the composite material between the compaction roller and the nozzle.

10. The method of claim 9, further comprises filtering the profile with at least one of a moving average or a Fast Fourier Transform.

11. The method of claim 9, further comprising:

based on the profile, adjusting at least one gate aperture blade of a variable gate so as to control a dimension of the composite material extruded out of the nozzle.

12. The method of claim 9, further comprising:

moving a movable stage coupled to the workpiece such that a relative speed of the workpiece with respect to the material feed system is substantially the same as the linear extrusion speed of the composite material extruded out of the nozzle.

13. The method of claim 9, further comprising:

based on the profile or extrusion information indicative of the linear extrusion speed of the composite material out of the nozzle, moving a movable stage coupled to the workpiece such that the composite material extruded out of the nozzle is aligned with a cavity along a surface of the workpiece.

14. The method of claim 9, further comprising:

receiving, from a vacuum gauge, vacuum information about a vacuum level of the material container, wherein causing a material feed actuator of a material feed system to apply a force to a composite material contained in a material container is initiated in response to the vacuum information being indicative of the vacuum level of the material container being below a desired vacuum level.

15. The method of claim 9, further comprising:

receiving, from the workpiece sensor, information that is indicative of at least one of a lead-in condition or a lead-out condition; and in response to determining the lead-in condition or the lead-out condition, adjusting the force applied to the composite material in the material container.

16. The system of claim 1, wherein the extruded material sensor is configured to provide information indicative of a shape of the composite material extruded out of the nozzle.

17. The system of claim 1, wherein the camera is configured to provide information indicative of a shape of the composite material extruded out of the nozzle, wherein the controller is further configured to adjust a relative speed of one or more of the workpiece the linear extrusion speed, so as to achieve a desired shape of the composite material extruded out of the nozzle.

18. The system of claim 1, wherein dynamically adjusting the linear extrusion speed to maintain the predefined shape of the composite material between the compaction roller and the nozzle comprises dynamically adjusting the linear extrusion speed to maintain a predefined desired radius of curvature of the composite material.

19. The method of claim 9, wherein the extruded material sensor is configured to provide information indicative of a shape of the composite material extruded out of the nozzle.

20. The method of claim 9, wherein dynamically adjusting the linear extrusion speed to maintain the predefined shape of the composite material between the compaction roller and the nozzle comprises dynamically adjusting the linear extrusion speed to maintain a predefined desired radius of curvature of the composite material.

* * * * *